United States Patent
Bosboom et al.

(10) Patent No.: US 11,566,665 B2
(45) Date of Patent: Jan. 31, 2023

(54) APPARATUS, SYSTEM AND METHOD FOR AN AIR BEARING STAGE FOR COMPONENT OR DEVICES

(71) Applicant: JABIL INC., St. Petersburg, FL (US)

(72) Inventors: Jeroen Bosboom, St. Petersburg, FL (US); Babak Naderi, St. Petersburg, FL (US); Payman Rahimi, St. Petersburg, FL (US); Michael McKenney, St. Petersburg, FL (US); Kwok Yu, St. Petersburg, FL (US); George Kovatchev, St. Petersburg, FL (US); Jeffrey Villegas, St. Petersburg, FL (US); Ward Palmer, St. Petersburg, FL (US); Jose Luna, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 17/706,337

(22) Filed: Mar. 28, 2022

(65) Prior Publication Data
US 2022/0349443 A1 Nov. 3, 2022

Related U.S. Application Data

(63) Continuation of application No. 16/461,094, filed as application No. PCT/US2017/062065 on Nov. 16, 2017, now Pat. No. 11,286,984.
(Continued)

(51) Int. Cl.
*F16C 32/06* (2006.01)
*B23P 19/10* (2006.01)

(52) U.S. Cl.
CPC ........ *F16C 32/0614* (2013.01); *B23P 19/102* (2013.01)

(58) Field of Classification Search
CPC .. F16C 32/0614; B23P 19/102; B25J 17/0208
See application file for complete search history.

(56) References Cited

U.S. PATENT DOCUMENTS 4,789,292 A * 12/1988 Holcomb ............. B25J 17/0208
29/709
6,877,215 B2 * 4/2005 Pfeiffer ................ B25J 17/0208
29/760
(Continued)

FOREIGN PATENT DOCUMENTS

JP 08172298 A * 7/1996
JP 08172298 A 7/1996
WO WO-2018094081 A2 * 5/2018 ............ B23P 19/102

OTHER PUBLICATIONS

International Search Report and Written Opinion dated Jun. 18, 2018 in PCT/US2018/062065.
(Continued)

*Primary Examiner* — Bayan Salone
(74) *Attorney, Agent, or Firm* — Thomas J. McWilliams; Barnes & Thornburg LLP

(57) ABSTRACT

The disclosure provides an apparatus, system and method for a moveable bearing stage that allows for highly refined alignment and placement, and particularly planar alignment and placement, of component or devices through the use of robotics. The apparatus, system and method of providing at least a planar alignment of at least one component or device in relation to a secondary reference plane may include at least: a frame and stator assembly, having, at an upper portion thereof, at least a semi-spherical receiving interface; a movable assembly that moves within the frame and stator assembly, and that is connectively associated therewith by at least a plurality of springs; a semi-spherical stage, suitable for reception by the semi-spherical receiving interface and capable of at least rotational movement therewithin; a chuck within the semi-spherical stage and capable of at least co-planar, post-planar, and ante-planar positioning in relation to a plane provided by a topmost portion of the semispherical stage, wherein the chuck is capable of receiving the component or device; and at least two gripper jaws suitable for receiving and holding, at an upper portion
(Continued)

thereof, the component or device, wherein the two gripper jaws comprise, at a lower portion thereof, at least ramps capable of physically interacting with ones of the motion stops.

5 Claims, 19 Drawing Sheets

Related U.S. Application Data

(60) Provisional application No. 62/422,857, filed on Nov. 16, 2016.

(56) References Cited

U.S. PATENT DOCUMENTS

| | | | |
|---|---|---|---|
| 6,891,601 B2* | 5/2005 | Jeanne | G03F 7/707 318/135 |
| 7,976,263 B2* | 7/2011 | Barker | H01L 21/681 414/416.11 |
| 8,458,896 B2* | 6/2013 | Chandrasekaran | G11B 25/043 29/729 |
| 2002/0132043 A1* | 9/2002 | Cromwell | B05D 1/18 427/127 |
| 2004/0231593 A1* | 11/2004 | Edwards | B29C 64/112 118/719 |
| 2004/0231594 A1* | 11/2004 | Edwards | B25B 11/005 118/719 |
| 2005/0012920 A1* | 1/2005 | Jeanne | G03F 7/70758 318/135 |
| 2005/0280314 A1* | 12/2005 | Jeanne | G03B 27/58 310/10 |
| 2009/0082895 A1* | 3/2009 | Barker | H01L 21/68 414/800 |

OTHER PUBLICATIONS

International Preliminary Report on Patentability, dated May 21, 2019 for PCT/US2018/062065.

* cited by examiner

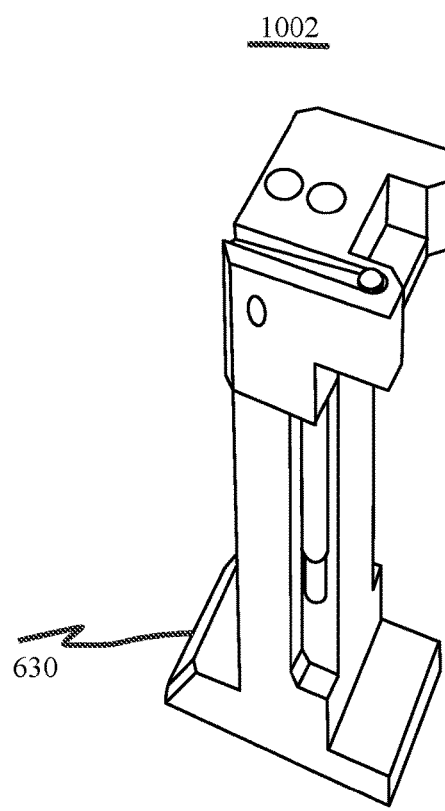 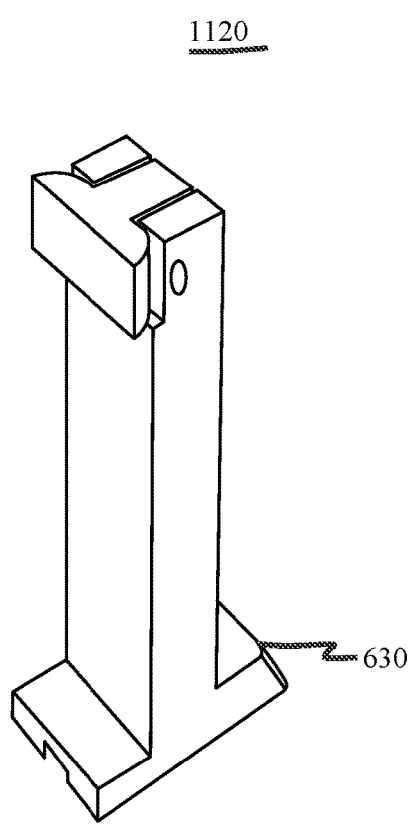
FIG. 11B    FIG. 11C

APPARATUS, SYSTEM AND METHOD FOR AN AIR BEARING STAGE FOR COMPONENT OR DEVICES

CROSS-REFERENCE TO RELATED APPLICATIONS

This application is a Continuation Application of U.S. application Ser. No. 16/461,094, filed May 15, 2019, entitled "Apparatus, System and Method for an Air Bearing Stage for Component or Devices" which is a national stage application of International Patent Application No. PCT/US2017/062065, filed Nov. 16, 2017, entitled "Apparatus, System and Method for an Air Bearing Stage for Component or Devices" which claims priority to U.S. provisional Application No. 62/422,857, filed Nov. 16, 2016, entitled "Apparatus and Method for an Air Bearing Stage for Component or Devices," which is hereby incorporated by reference.

BACKGROUND

Field of the Disclosure

The disclosure relates generally to manufacturing equipment, such as robotic equipment, and, more particularly, to an apparatus, system and method for an air bearing stage used to spatially align, place or connect components or devices, such as components of an apparatus, for assembly or other processing.

Description of the Background

Automated or semi-automated equipment is commonly employed in many industrial applications. For example, automated or semi-automated equipment is often employed to make connections between electronic components. Oftentimes, these connections, and/or connection associated or prescribed alignments and placements, may typically require a prescribed accuracy, delicateness and precision.

One known effort to align, place or connect devices or components is disclosed in U.S. Pat. No. 4,789,292, the entire disclosure of which is hereby incorporated by reference as if being set forth in its entirety herein. The approach described therein uses dual ball-and-socket assemblies coupled together to provide enhanced range of movement in aligning and placing electronic components. However, that particular approach may be unsuitable in certain cases, such as in which planar alignment of irregularly shaped devices or components is needed.

Therefore, the need exists for a moveable bearing stage that allows for highly refined alignment and placement, and particularly planar alignment and placement, of component or devices or components through the use of automation or semi-automation, like robotics.

SUMMARY

Certain embodiments of the present invention include an apparatus, system and method for a moveable bearing stage that allows for highly refined alignment and placement, and particularly planar alignment and placement, of component or devices through the use of robotics. More particularly, an exemplary apparatus, system and method of providing at least a planar alignment of at least one component or device in relation to a secondary reference plane may include at least: a frame and stator assembly, having, at an upper portion thereof, at least a semi-spherical receiving interface; a movable assembly that moves within the frame and stator assembly, and that is connectively associated therewith by at least a plurality of springs; a semi-spherical stage, suitable for reception by the semi-spherical receiving interface and capable of at least rotational movement therewithin; a chuck within the semi-spherical stage and capable of at least co-planar, post-planar, and ante-planar positioning in relation to a plane provided by a topmost portion of the semispherical stage, wherein the chuck is capable of receiving the component or device; and at least two gripper jaws suitable for receiving and holding, at an upper portion thereof, the component or device, wherein the two gripper jaws comprise, at a lower portion thereof, at least ramps capable of physically interacting with ones of the motion stops. By way of example, the reference plane may also be a pitch-adjustable surface.

The moving assembly may include at least a floating yoke portion, having associated therewith at least: a plurality of linear motion stops; and a tactile portion that physically interacts with the plurality of linear motion stops and that is suitable for assessing a plane of a topmost portion of the component or device in relation to a second reference plane. The movable assembly may allow for placement of a plane provided by the topmost portion of the component or device into a suitable position with respect to the second reference plane so as to allow for processing of the component or device and a second electronic element that provides the second reference plane. The apparatus, system and method may further include: an air inlet suitable for enhancing the float of the floating yoke portion; and a vacuum associated with the chuck and suitable for grasping the component or device.

More specifically, an exemplary method of providing at least a planar alignment of at least one component or device in relation to a secondary reference plane may include at least: centering an air bearing stage using at least synchronous jaw grippers having ramps associated therewith, and interaction of those ramps with one or more motion limiters; moving the air bearing stage in multiple axes; providing the component or device to the centered, moved air bearing stage; switching off an air float affecting the component or device; actuating a vacuum to grip the component or device; closing the jaw grippers on the component or device; extending a tactile system to assess a planar alignment of the component or device with the secondary reference plane; switching on the air float to affect the component or device; and engaging the component or device to an element having the secondary reference plane based at least on an outcome of the extension of the tactile system.

Thus, the disclosure provides at least an apparatus, system and method for a moveable air bearing stage that allows for highly refined alignment and placement, and particularly planar alignment and placement, of component or devices for and during use in automated or semi-automated, such as in robotics-based, manufacturing processes.

BRIEF DESCRIPTION OF THE DRAWINGS

The exemplary compositions, systems, and methods shall be described hereinafter with reference to the attached drawings, which are given as non-limiting examples only, in which:

FIG. 11B is an illustration of features of the disclosed embodiments;

FIG. 11C is an illustration of features of the disclosed embodiments;

DETAILED DESCRIPTION

Figure 1:
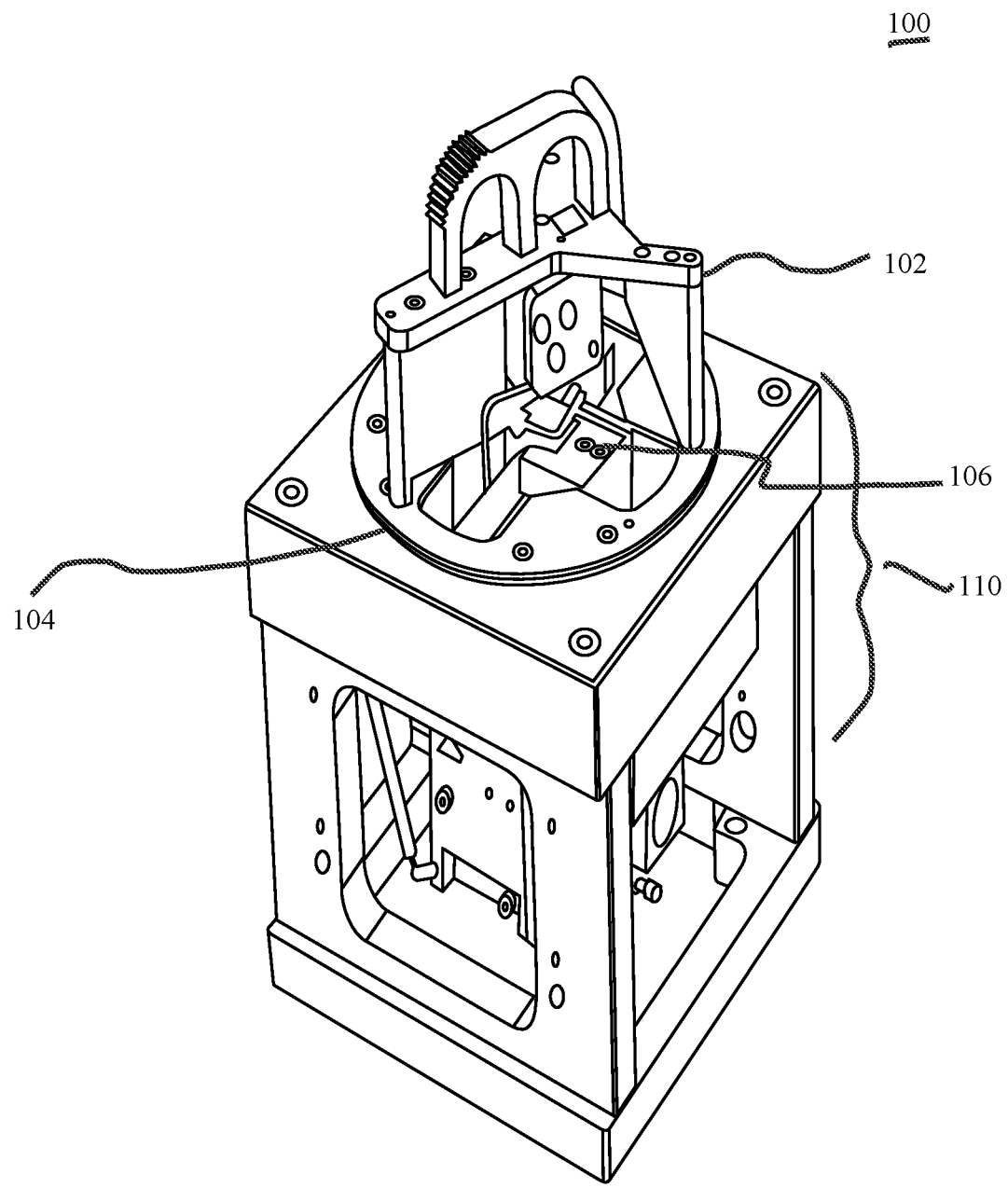
FIG. 1 is an illustration of features of the disclosed embodiments.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, embodiments described herein should not be construed to limit the scope of the disclosure.

As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first device, element, component, region, layer or section discussed below could be termed a second device, element, component, region, layer or section without departing from the teachings of certain embodiments.

Certain embodiments of the disclosure provide at least an alignment apparatus, system and method for establishing linear and/or planar positioning between first and second surfaces of paired, placed components. Such components may be mechanical, electrical or electronic, electro-magnetic, optical or photonics in nature, all by way of non-limiting example. Certain embodiments of the disclosure provide improved performance and manufacturing efficiency, particularly in products in which planar alignments and refined placement may be critical to performance Although they may not be referenced with particularity herein, exemplary embodiments may include additional process steps in the placement and alignment of elements. Such steps may include, by way of non-limiting example, applications of adhesives to parts, curing of processed parts, such as using UV or heat, or the like.

Certain embodiments of the disclosure may accomplish the foregoing through the use of a movable assembly comprising at least a movable yoke that "floats" within a frame and/or stator assembly. The "floating" nature of the movable assembly may be provided using alternating air and vacuum; and springs and linear elements, by way of non-limiting example. One or more air inlets, pressure ports, and vacuum ports may provide the aforementioned air and vacuum. Moreover, the referenced air and/or vacuum and/or pressure may be separately supplied to several different elements discussed herein, such as to the gripper as compared to the chuck.

By way of further, non-limiting explanation only, such a moveable assembly may include pneumatics; and ramps, pins, bearings, bushings, and linear columns and platforms, all operatively linked to an at least partially spherical element or stage. Within such a bearing stage may be provided an open area having clamping jaws and a chuck therein or proximate thereto, such as for receiving and holding a component or device to be aligned. Provided in association with the stage may be air and vacuum for affecting a component or device registered or otherwise associated with the stage. Likewise, a clamp, such as a servo clamp, a magnetic coupling, a tool changer coupling, and/or a temporary adhesive coupling may be provided.

The component or device may, once grasped at the stage of the movable assembly, be positioned with respect other elements with which the component or device is to be associated, such as in a robotic-based manufacturing process. This positioning may occur as a result of the movement of the component or device upon the stage into a new position by one or more robotic elements, such as a robotic arm and/or a gantry. Once positioned relative to one another, the two components, devices or elements may be formed into, or as part of, a device or product.

Compliant, e.g., floating planar, aspects of certain embodiments of the disclosure may provide numerous advantages. For example, the air bearing system provides multiple ranges of movement, and increased alignment accuracy, particularly for planar alignment, over the known art.

FIG. 1 illustrates an air bearing system 100 for placing or aligning a device or component that includes a component or device placement tool 102, a moveable component or device assembly 104 that may include a bearing stage 106 at the top of said moveable assembly 104, and a frame and stator 110 that mechanically aligns and maintains the features of the bearing stage 106 and the moveable assembly 104. The bearing stage 106 may receive and/or provide air, and thus may, in conjunction with the moveable assembly, provide a "float", and a vacuum for application to the component or device.

Figure 2A:
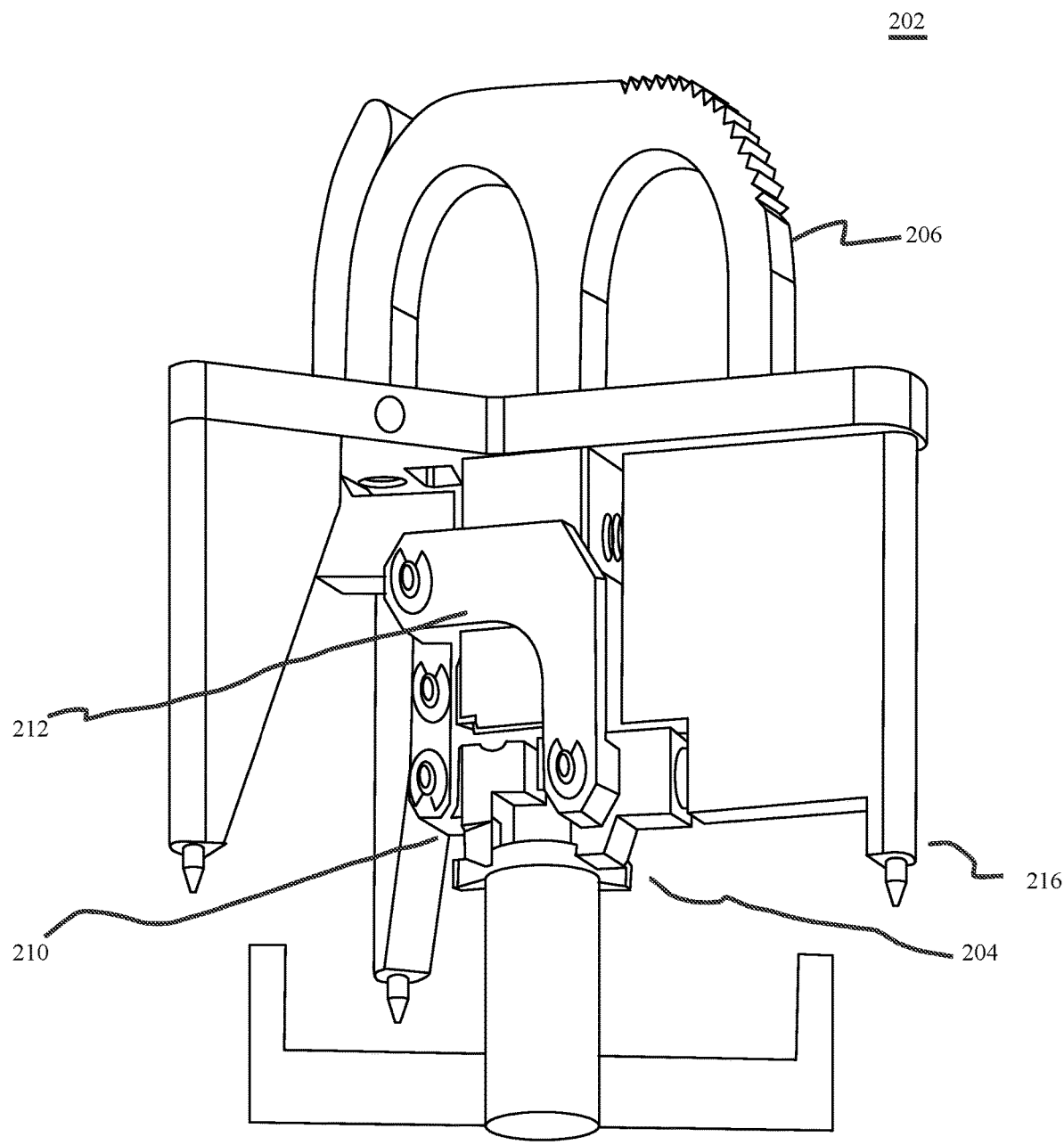
FIG. 2A is an illustration of features of the disclosed embodiments.
Figure 2B:
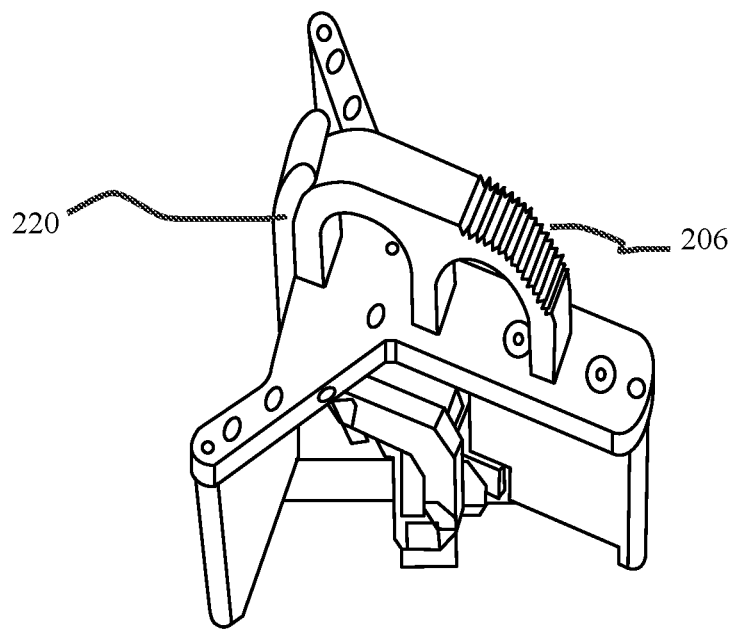
FIG. 2B is an illustration of features of the disclosed embodiments.
Figure 2C:
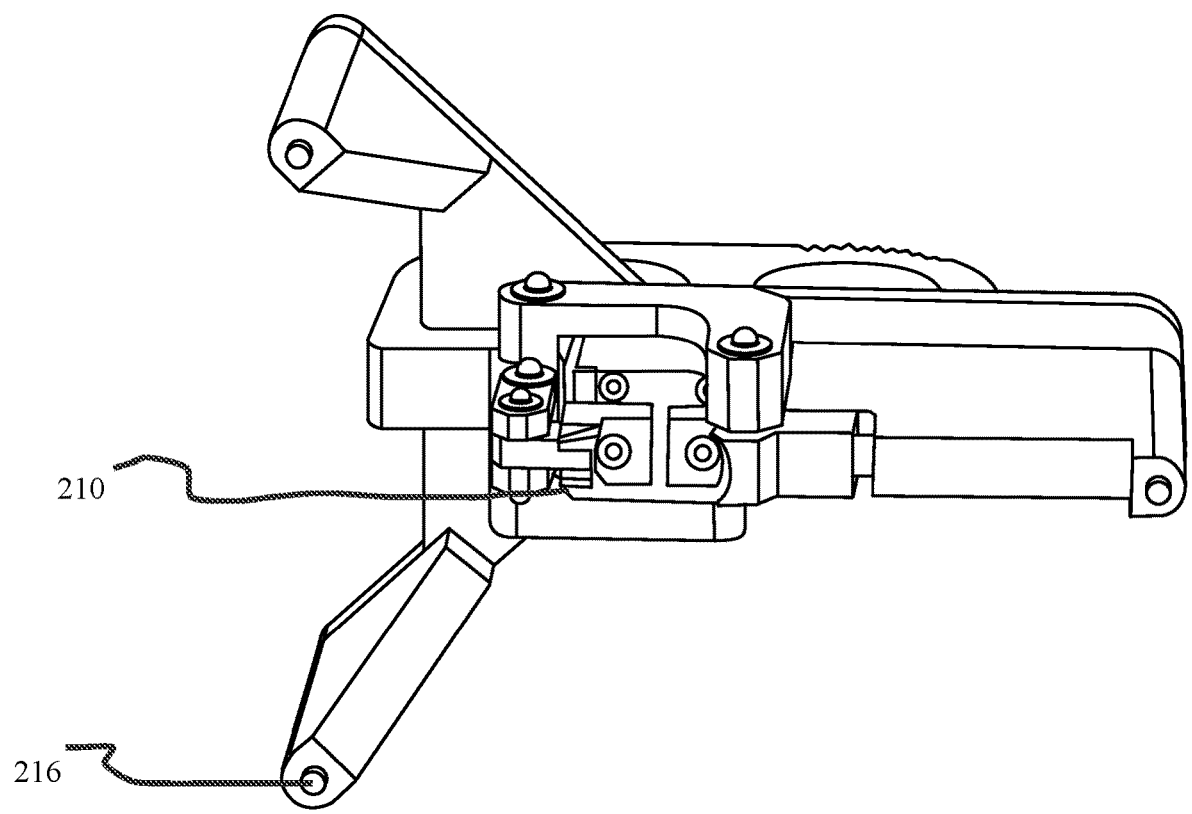
FIG. 2C is an illustration of features of the disclosed embodiments.

FIGS. 2A, 2B, and 2C illustrate an exemplary placement, or handoff, tool 202 for placing and/or moving an electronic device 204, such as may be moved in order to physically associate the electronic device with bearing system 102, also sometimes referred to herein as a "component chuck." As illustrated in FIG. 2A, the component chuck 202 may include various features. For example, the component chuck 202 may include a handle 206, such as the two-finger grip handle illustrated at the top of FIG. 2A. This handle may be any grip suitable for grasping by manual or automated means, i.e., the grip may receive the fingers of a person to allow for the person to move an electronic device grasped by the component chuck, and/or the grip may include any clasp, opening, tab, latch, adhesive, or the like that may allow for grasping of the component chuck by any automated methodology, such as by a robot. Also illustrated in FIG. 2A is the electronic device 204 being grasped by a grasp or grippers 210 at a base of the component chuck. Also shown are one or more lever arms 212 or similar mechanical means to actuate the gripper or grippers 210 such that the electronic device 204 may be grasped by the component chuck. Also shown are one or more alignment interfaces 216 for alignment and physical placement of chuck 202 and/or the device 204 associated therewith, such as with respect to the disclosed bearing stage 100, and/or to otherwise form a mechanical or positional interface.

FIG. 2B illustrates an exemplary two-finger manual handle 206, and additionally, at a back portion of the two-finger handle, a release or actuator 220, such as the lever shown. Actuator 220 may allow for actuation of or release of the gripper 210, such as may be present at the base of the component chuck 202, and as such may be suitable for causing component or device 204 to be grasped and/or moved. FIG. 2C illustrates gripper 210 in the form of gripping jaws on the underside portion of the exemplary handle, wherein the gripping jaws 210 may be actuated by actuation of the lever 220 shown in FIG. 2B. Any suitable gripping methodology, such as the illustrated gripping jaws, clips, latches, hooks, adhesives, or the like may be used to grasp a component or device to be moved with a component chuck. Such gripping methodologies may be actuated by any automated or manual means that may be associated with a component chuck, such as a spring close or spring release lever as is illustrated in FIG. 2, a button, a latch, an electronic sensor, or any known manual or automated actuation or release mechanism, all by way of non-limiting example.

FIG. 2C illustrates the use of an alignment interface 216 in the form of tooling pins to align and register the component chuck 202 with a receiving bearing stage 100. It will be appreciated that, although three tooling pins 216 are shown in FIG. 2C, any number of tooling pins or other registration, alignment, or mechanical interaction methodologies apparent to the skilled artisan in light of the discussion herein may be used with certain embodiments.

Figure 3:
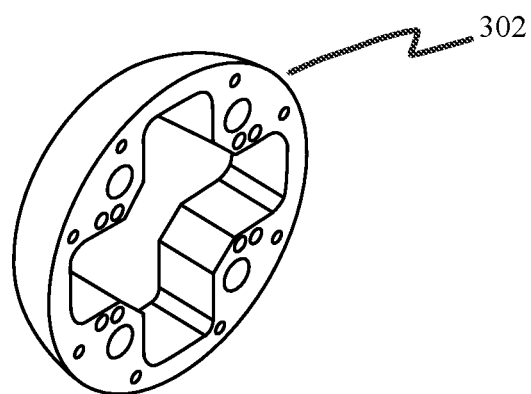
FIG. 3 is an illustration of features of the disclosed embodiments.

FIG. 3 illustrates an exemplary air bearing device stage 302 for use in certain embodiments of the disclosure. As illustrated, the device stage 302 may be spherical in shape, or otherwise suitable for multi-access movement, such as including rotational movement. This may allow for the stage 302 to move with the moveable assembly 104 discussed throughout to thereby allow for multi-access, including multi-planar, alignments of the electronic device 204 associated with the stage 302, such as with respect to other electronic devices, chuck 202, or otherwise.

Figure 4:
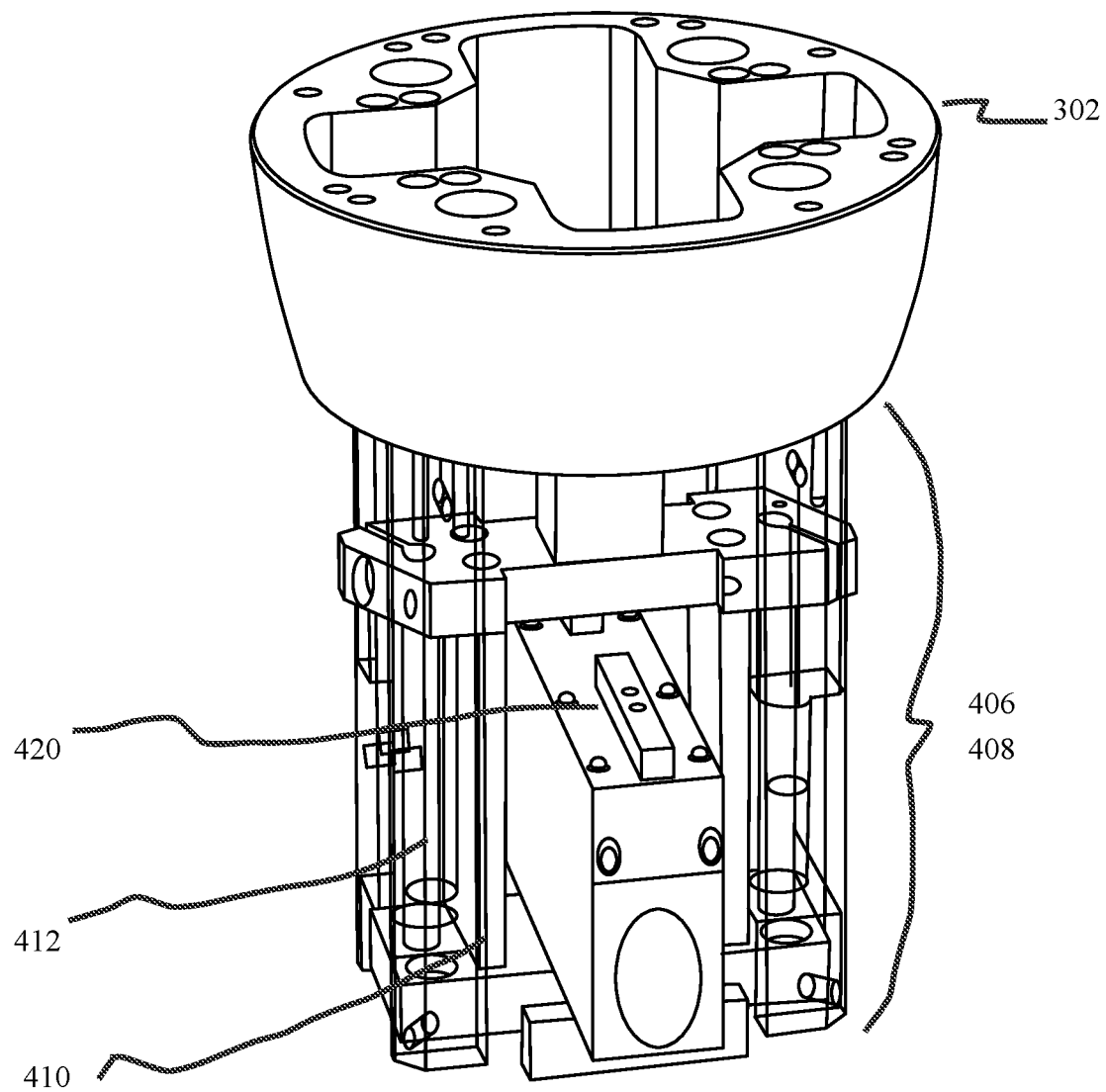
FIG. 4 is an illustration of features of the disclosed embodiments.

FIG. 4 illustrates an exemplary association of the stage 302 with mechanical support 402. Support 402 for the stage 302 includes motion-limiting features 404 for aspects of the moveable assembly 104 with which the stage 302 is associated. In the illustrated embodiment, the partial spherical nature of the stage 302, and the supporting columns 406 therefore, along with the bushings 408 of those support columns 406, may provide independent structural support for the moveable assembly 104 to move in multiple axes and/or multiple planes within the frame and stator assembly 110. As additionally illustrated in FIG. 4, way shafts 410 and vertical link plates 412 may be provided to additionally provide structural support and movement capabilities for the moveable assembly 104, and hence for the stage 302 and staging clamps associated with the moveable assembly.

Yet further, certain motion stop features for the stage 302 and clamps within the moveable assembly 104 are shown in relation to the embodiment of FIG. 4. For example, dual tooling plates 414, such as may be linked with vertical plates and shafts, may provide suitable motion limitations for movements of the moveable assembly 104. Also illustrated in FIG. 4, at the base of the moveable assembly, is a parallel gripper actuator 420 which actuates the clamps/gripper jaws associated with stage 302.

Figure 5:
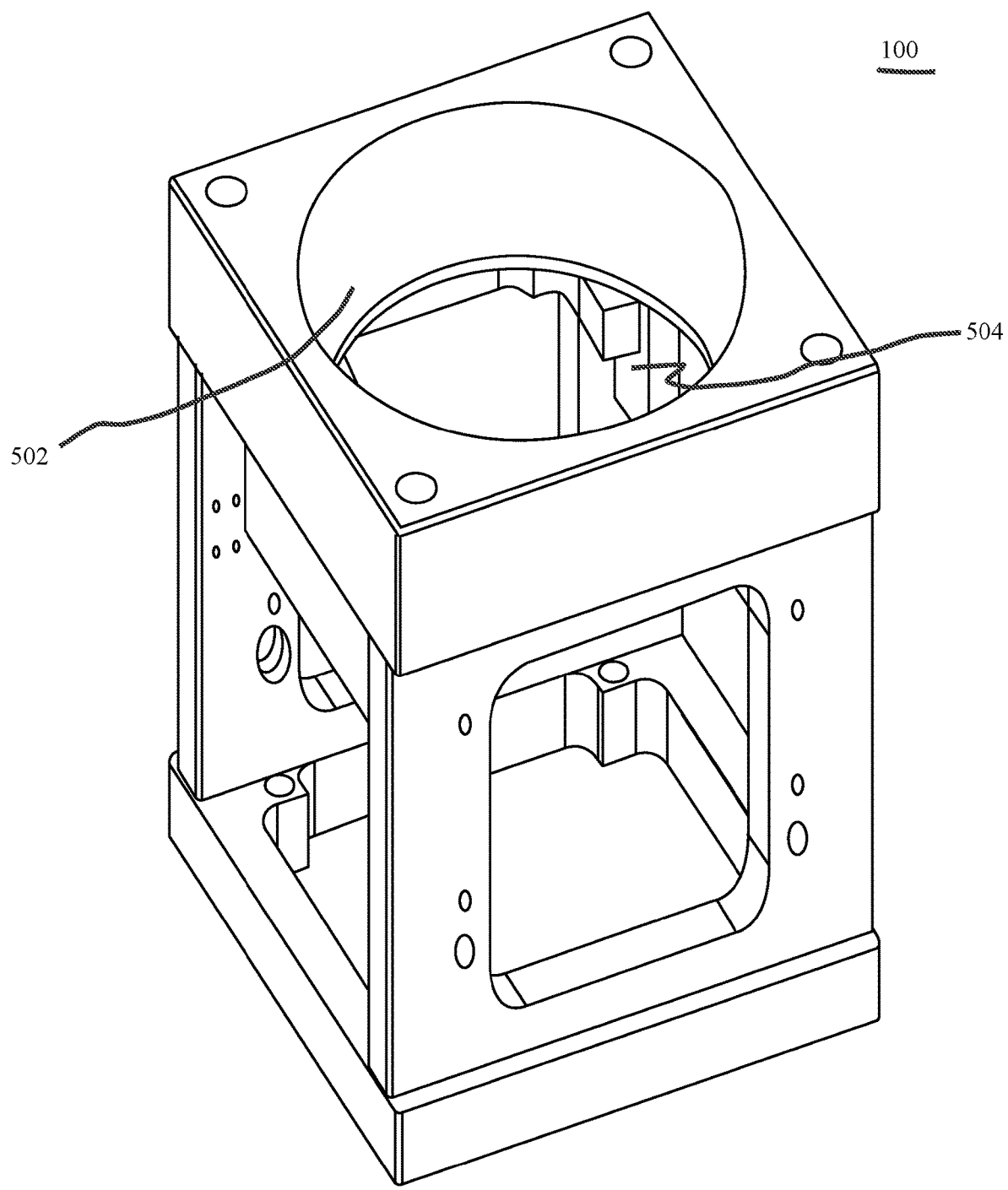
FIG. 5 is an illustration of features of the disclosed embodiments.

FIG. 5 is an illustration of an exemplary frame and stator assembly 110 suitable for use with a moveable assembly 104. As illustrated, the frame and stator 110 may include a receiving area 502 for a partially spherical stage 302, and one or more mechanical and support elements 504 for interconnection with or direct or indirect attachment to other elements, frames, and the moveable assembly 104.

Figure 6:
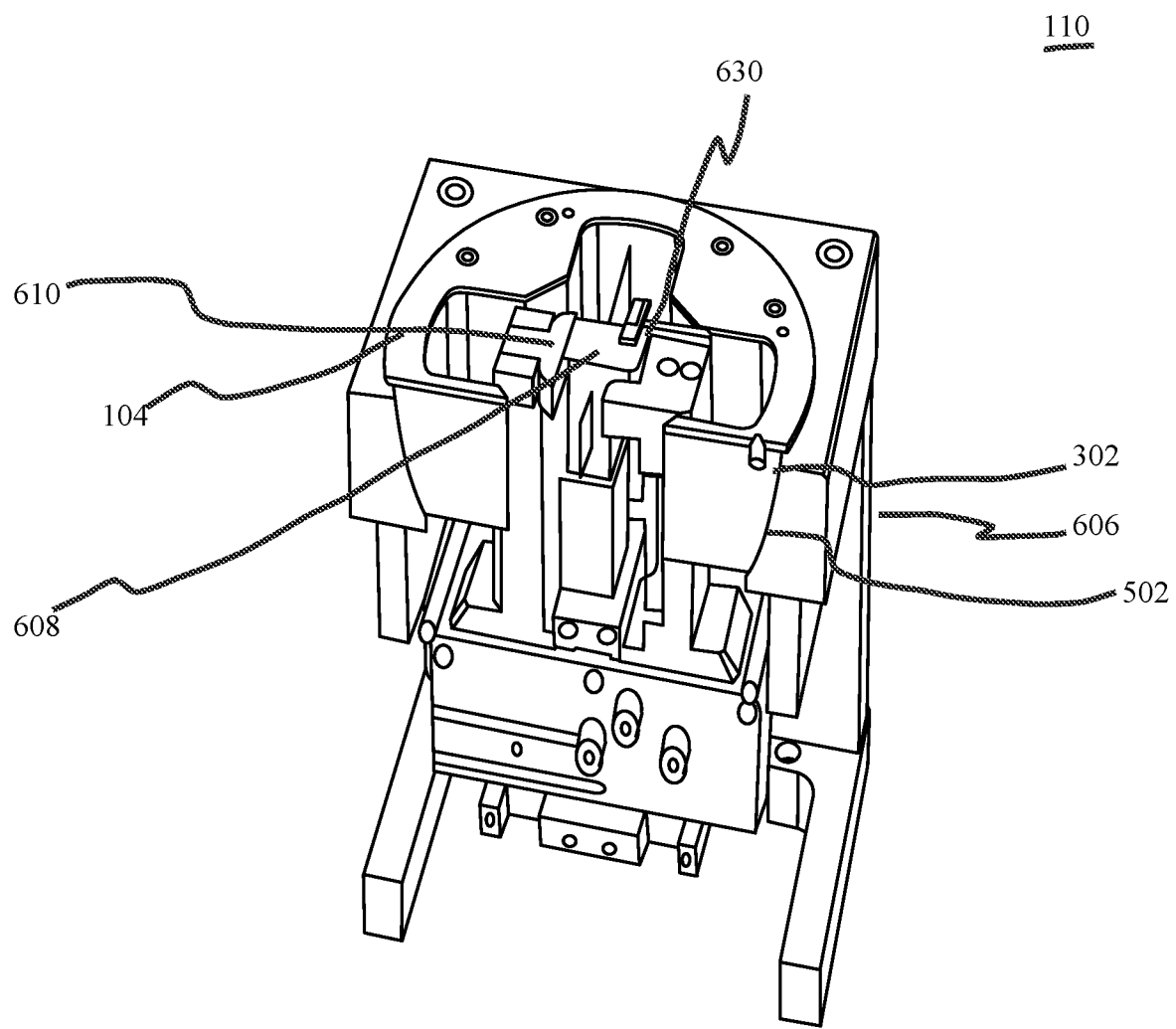
FIG. 6 is an illustration of features of the disclosed embodiments.

FIG. 6 is a cutaway illustration of a cross-sectional view of an exemplary frame and stator assembly 110, and its interaction with an exemplary moveable assembly 104. In the illustrated embodiment, the stage 302 resides within a semi-spherical receiving portion 502 of the frame and stator assembly 110. Within the moveable assembly 104 and associated with the horizon level 606 provided by the stage 302 is a support chuck 608 for receiving a component or device 204, such as from the component chuck 202 discussed hereinabove. Chuck 608 may have associated therewith the capability to provide a vacuum, and/or an air inlet to provide an air float, as referenced herein above. Alternatively, the air and/or the vacuum may be provided about the chuck 608 within stage 302 from a secondary source.

Also evident in association with the component or device support chuck 608 are two gripper jaws 610 that are actuated from the gripper jaw actuator 420 discussed with respect to FIG. 4. The illustrated gripper actuator 420 may be, for example, a parallel gripper that simultaneously forces the gripping jaws 610 illustrated in FIG. 6 together and apart in a synchronous or substantially synchronous manner. The parallel gripper actuator 420 may additionally include various other elements and features apparent to the skilled artisan, such as, for example, a vacuum scavenge, to allow for improved operation.

Further associated with the gripping jaws 610 actuated by parallel gripper actuator 420, such as at or near the base thereof, may be one or more ramp elements 630 suitable to engage with one or more motion-limiting pins 632. Thereby, for example, interaction of the ramp portion 630 of at least one the gripping jaws 610 (at the base thereof) with the one or more pins 632 may cause linear or angular movement of the support chuck 608, stage 302, and/or gripping jaws 610, and hence of the component or device 204 associated therewith, both with respect to the planar horizon 606 provided by the stage 302 and with respect to rotational angles about the center access thereof. In short, as the gripper jaws 610 move outwardly, each respective ramp 630 may engage with its respective pin(s) 632, and thereby the gripper jaws 610 and/or support chuck 608 may move vertically downward and/or angularly with respect to either or both sides. Similarly, as the jaws come together and the pin "rolls down" its respective ramp, the support chuck and/or gripper jaws may move vertically upward and/or rotationally, at least in part.

Figure 7:
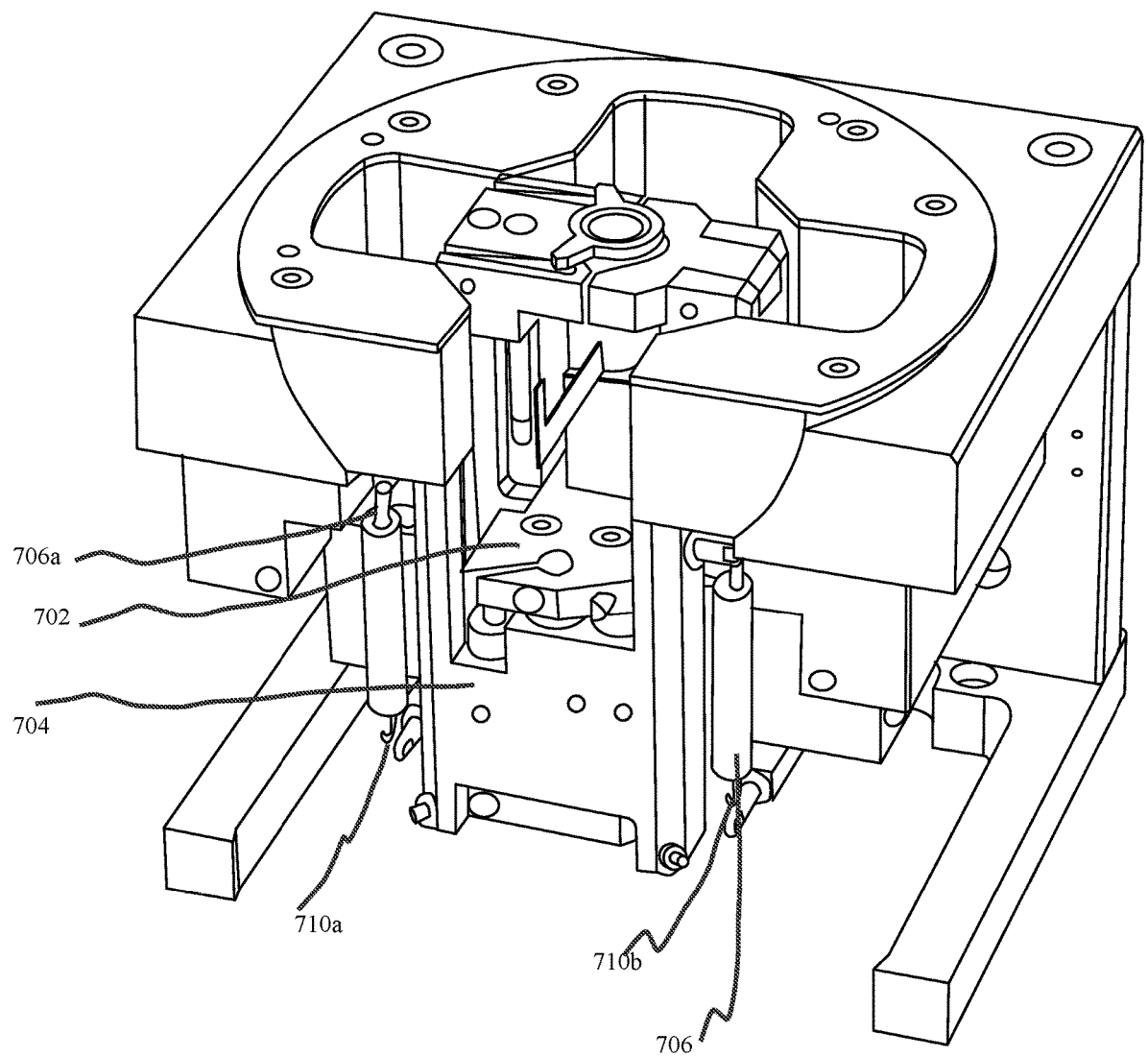
FIG. 7 is an illustration of features of the disclosed embodiments.

FIG. 7 provided a similar illustration to that of FIG. 6, but at a more proximately drawn cross-section. In the cross-sectional illustration shown, upper and lower motion-limiting plates 702 are illustrated. Further, in association with these plates 702, there is shown a front mechanical support 704, and one or more enabling elements 706 for vertical movement. In the illustration these vertical movement enabling elements include a pneumatic actuator 706a and a moveable shaft 706b, although the skilled artisan will appreciate in light of the discussion herein that other movement-enabling elements 706 may be provided, as may be additional movement-liming elements. Also illustrated in FIG. 7 are two springs 710a, 710b that may, for example, counterbalance the mass associated with the moveable assembly to allow for optimal movement and rotation of the moveable assembly. It goes without saying that any number of springs at any of various locations on the movable assembly 104 or the frame and stator 110 may be employed to carry out the function of springs 710a, 710b, and as such the illustration in FIG. 7 using two springs is merely exemplary of certain embodiments.

As such, the upper and lower plates 702 and the block, pins, shafts, and moving elements associated therewith may, in combination, provide a moveable yoke 720 that allows for movement of the moving assembly 104. In embodiments employing pneumatic cylinders, for example, the "H bracket" formed by plates 702 and the supporting structures therefore may both enable and limit movement of the yoke 720, to thereby enable and/or limit movement of the moving assembly 104. Moreover, this moving yoke 720 may allow for planarization of the miniature electronic device, the chuck, and/or the stage, either together or independently, such as to allow for uniform interaction, including co-planar alignment, with other devices or planes.

Figure 8:
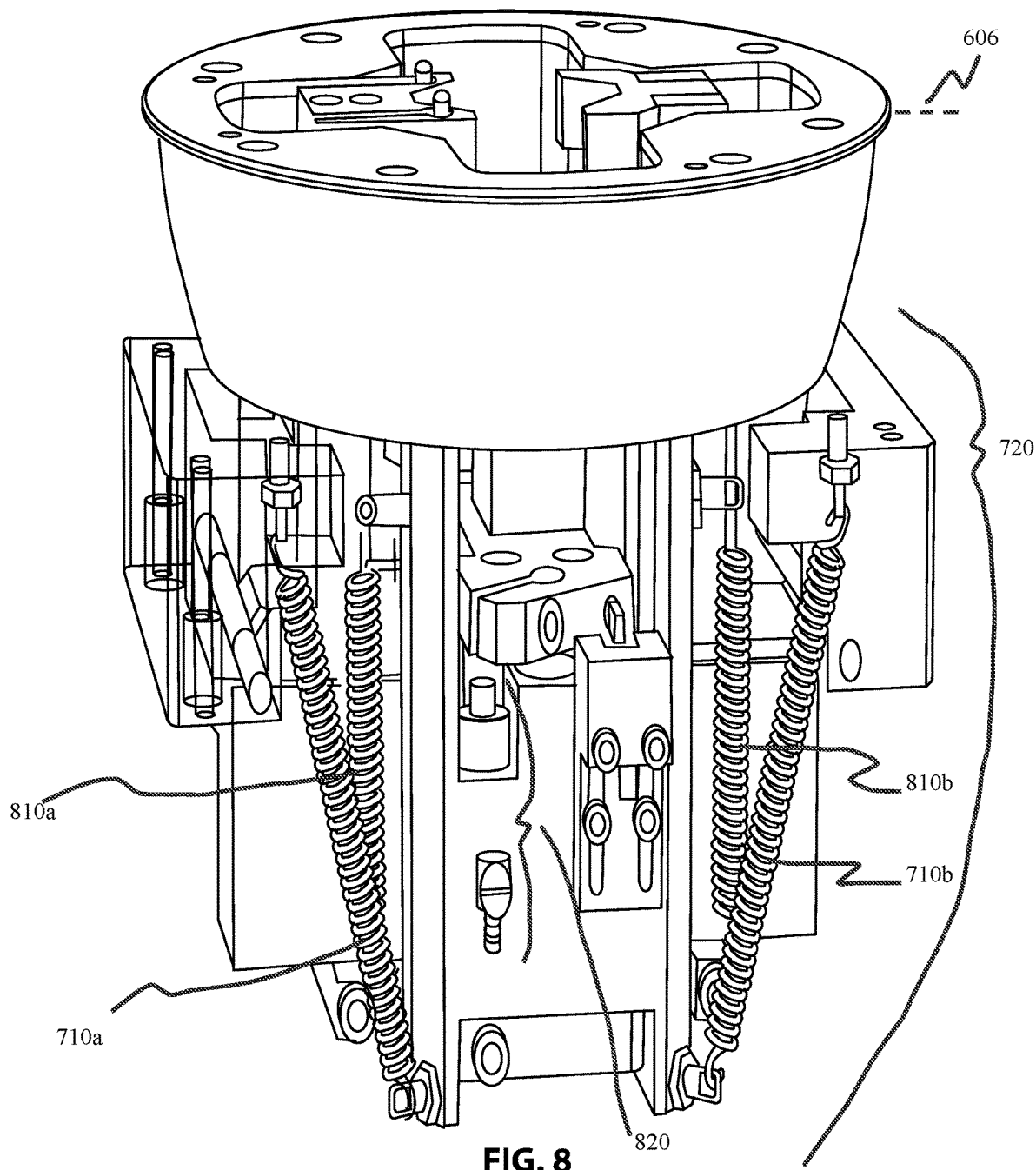
FIG. 8 is an illustration of features of the disclosed embodiments.

FIG. 8 shows additional aspects of the moving assembly 104 of the exemplary embodiments, such as including the physical interaction with the frame and stator assembly 110. As shown, not only may the moving assembly 104 have a number of springs 710 thereon to allow for mass counterbalancing and/or planarization as discussed above, but additional springs 810a, 810b may allow for "attachment" of or suitable physical association by the moving assembly in relation to one or more portions of the frame and stator assembly 110. Such interconnections may further allow for optimization of the movement of the moving assembly within the frame and stator assembly 110. Thereby, the moving assembly 104 and its interaction with the frame and stator assembly 110 may allow for the providing of a working plane at or below the stage horizon level 606. Moreover, the alignment of the moveable assembly 104 may accordingly be maintained at or close to system center, yet the moveable assembly 104 may provide a suspended vertical and rotational way system.

Yet further, FIG. 8 illustrates the exemplary inclusion of a lifting or descending lock system 820, such as with travel distance sensing 822. Thereby, FIG. 8 illustrates an embodiment in which a compliant Z access movement may be enabled in conjunction with the X and Y position horizon movement provided at the stage horizon 606.

Figure 9:
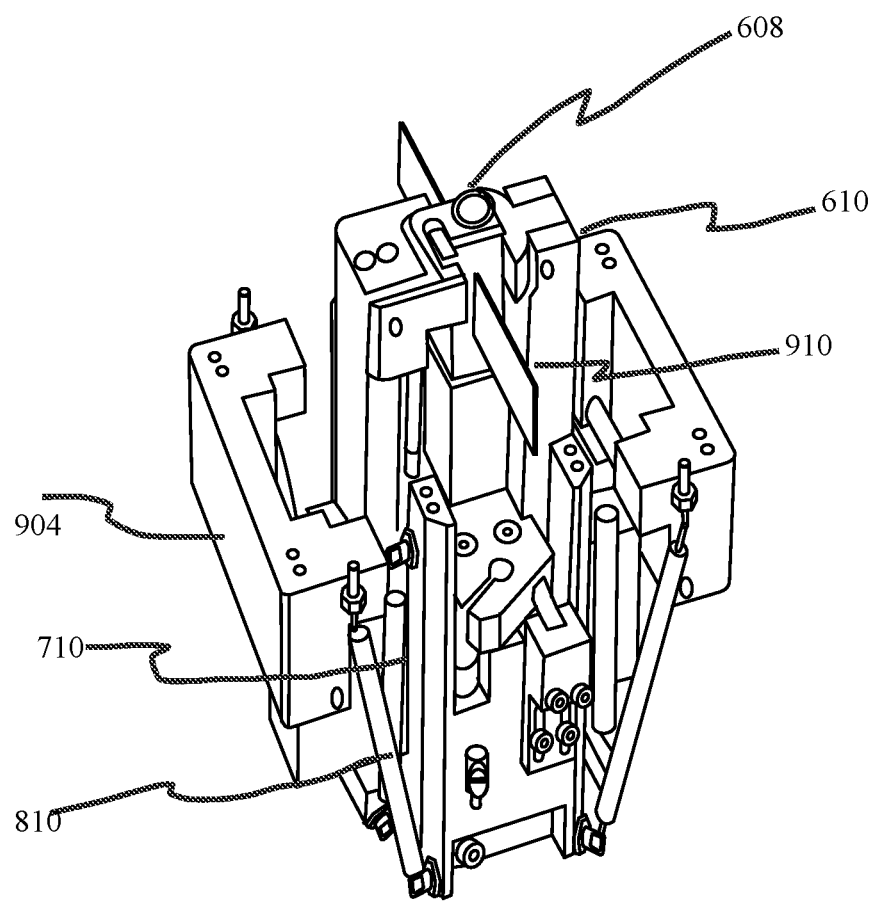
FIG. 9 is an illustration of features of the disclosed embodiments.

FIG. 9 illustrates additional aspects of an embodiment of a moving assembly 104. In the illustration, the chuck 608 for receiving the component or device 204 is shown grasped between gripper jaws 610 that have, in an internally synchronous manner, been moved by the gripper actuator cylinder into association with the chuck 608. Also shown in FIG. 9 are numerous movement-limiting elements 904, such as adjustable theta stops for limiting angular movement, a tactile lock cylinder, and bushings and bearings for limiting movement in the Z axis. The skilled artisan will appreciate that these movement-limiting elements 904 are exemplary in nature only, and various other elements that either limit or support movement may form part of certain embodiments of the disclosure. Further illustrated in the example of FIG. 9 are both tactile springs 710, such as for counterbalancing mass in the moving assembly, and torque control springs 810 that may limit the movement of the moving assembly, and specifically of the stage 302, chuck 608, and/or component or device 204 associated therewith.

FIG. 9 also illustrates a tactile sensor 910. Tactile sensor 910 is exemplary of one or more sensors that may be used to sense movement, or the stoppage thereof, by the moving assembly 104 with respect to certain embodiments disclosed throughout. Such sensors 920 may sense movement with respect to, for example, the frame and stator assembly 110. Sensors 910 may also sense process conditions, load levels, pressure levels, physical contact, performance, and the like.

Figure 10:
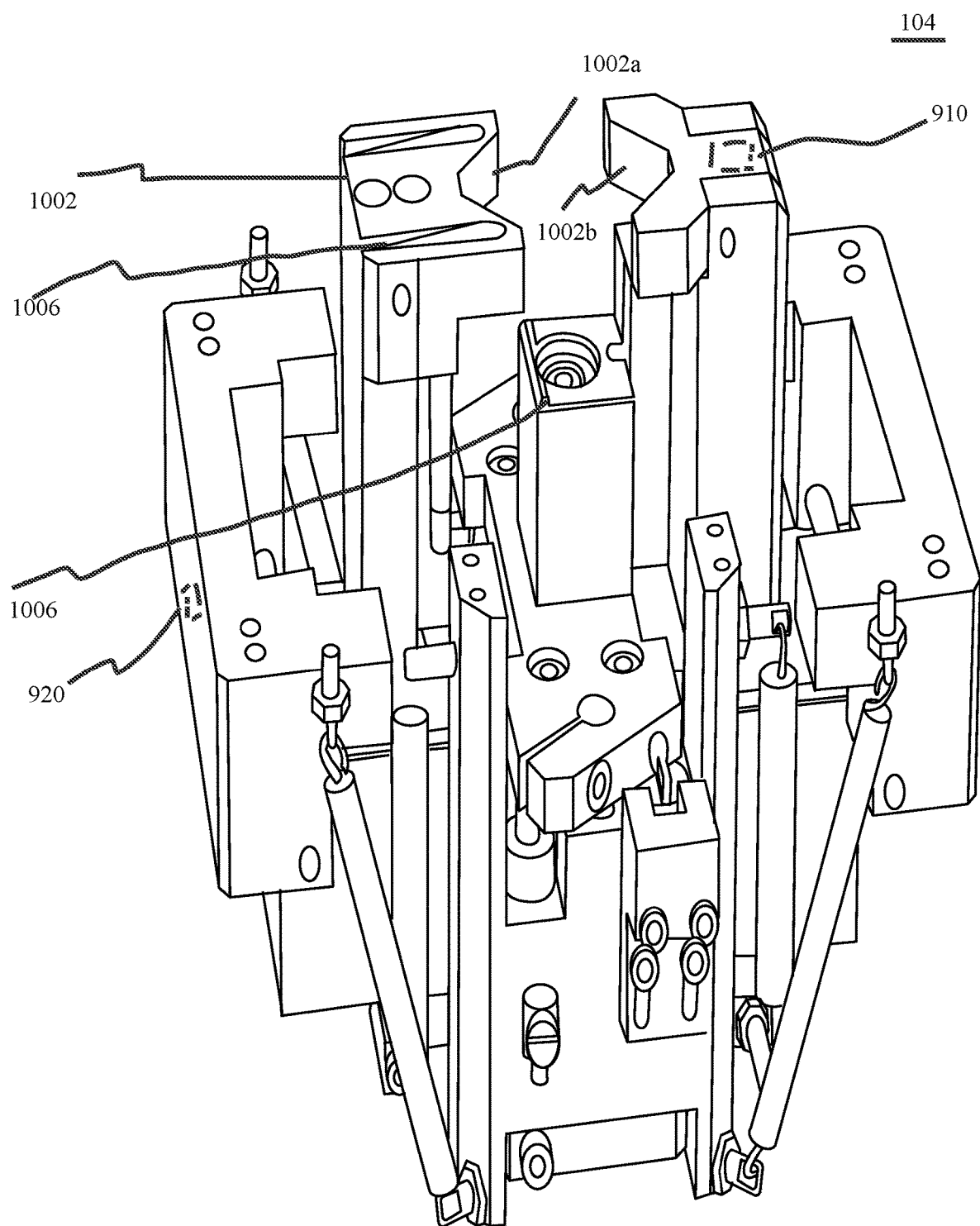
FIG. 10 is an illustration of features of the disclosed embodiments.

FIG. 10 is an additional example of a moving assembly 104. Although FIG. 10 does not include the receiving chuck 608 for the component or device 204 in the illustration, it does include modified gripper jaws 1002. Of note, the gripper jaws 1002 illustrated provide multi-angle facets 1002a, 1002b, such as in a triangular manner, to further provide for improved alignment of off-aligned component or devices 204 provided between the gripper jaws 1002. That is, in the illustrated embodiment each half clamp provided by a single side of the gripper jaws 1002 may allow for variability in the X-Y position and/or pitch of a subject component or device 204, while still assuring four points of contact with the gripper jaws 1002. Thereby, the positional stability of the component or device 204 and the accuracy in the placement of the component or device with respect to other secondary elements with which it is to be interacted are improved in certain embodiments of the disclosure. Of further note, FIG. 10 includes an additional component or device support arm 1006 to provide further mechanical support for component or device 204, such as wherein a component or device 204 is of a given height, or is otherwise maintained by the chuck 608 above or substantially above the horizon level 606 of the stage 302, and is thus in need of additional structural support prior to or upon placement.

Figure 11A:
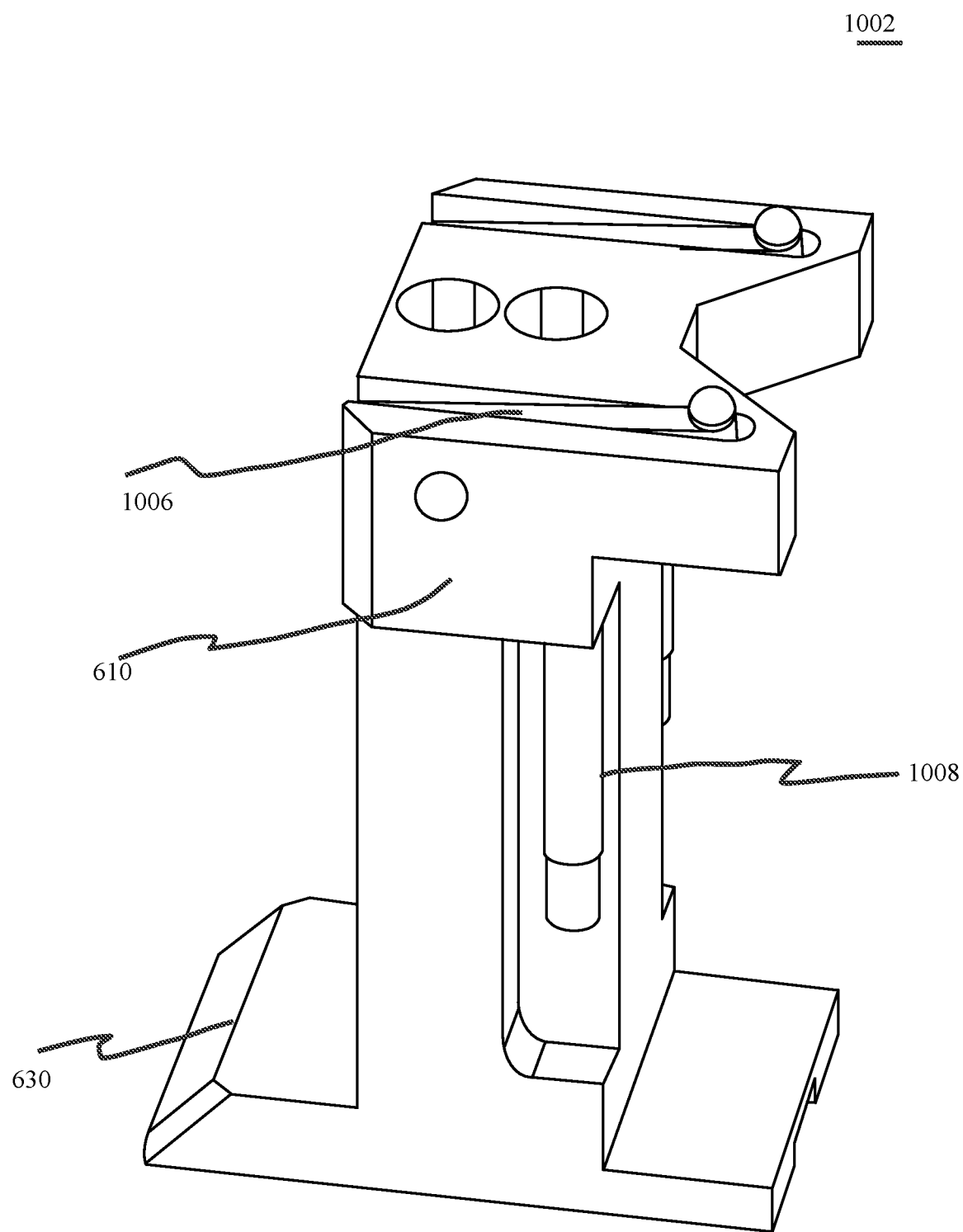
FIG. 11A is an illustration of features of the disclosed embodiments.

The foregoing secondary component or device support arm 1006 is further illustrated with regard to the exemplary grippers 1102 of FIGS. 11A and 11B. By way of nonlimiting example, the secondary support 1006 may be actuated by, for example, a pneumatic lift cylinder 1108 which allows for the secondary support arm to be raised. Also evident in FIGS. 11A and 11B is the ramp plane 630 at a lower and outermost portion of the gripper jaw 610, which as referenced above, may be used for centering of the moveable assembly 104 and for vertical and rotational variation of the position of the moving assembly 104.

The primary jaws 1102 illustrated in the examples of FIGS. 11A and 11B may be used to control the X-Y position of a component or device 204 associated therewith. FIG. 11C illustrates an exemplary secondary jaw 1120 that may follow a particular component or device geometry unique to certain uses. Of note, and as illustrated in FIG. 11C, the secondary jaw 1120 may include mechanical aspects to improve gripping of a component or device 204, such as spring loading or balancing, clamps, high friction surfaces, or the like. Also illustrated in the example of FIG. 11C is the association of a ramp plane 630 with the secondary jaw 1120, such as for the purposes indicated above with respect to the ramp plane 630 of FIGS. 11A and 11B.

Figure 12A:
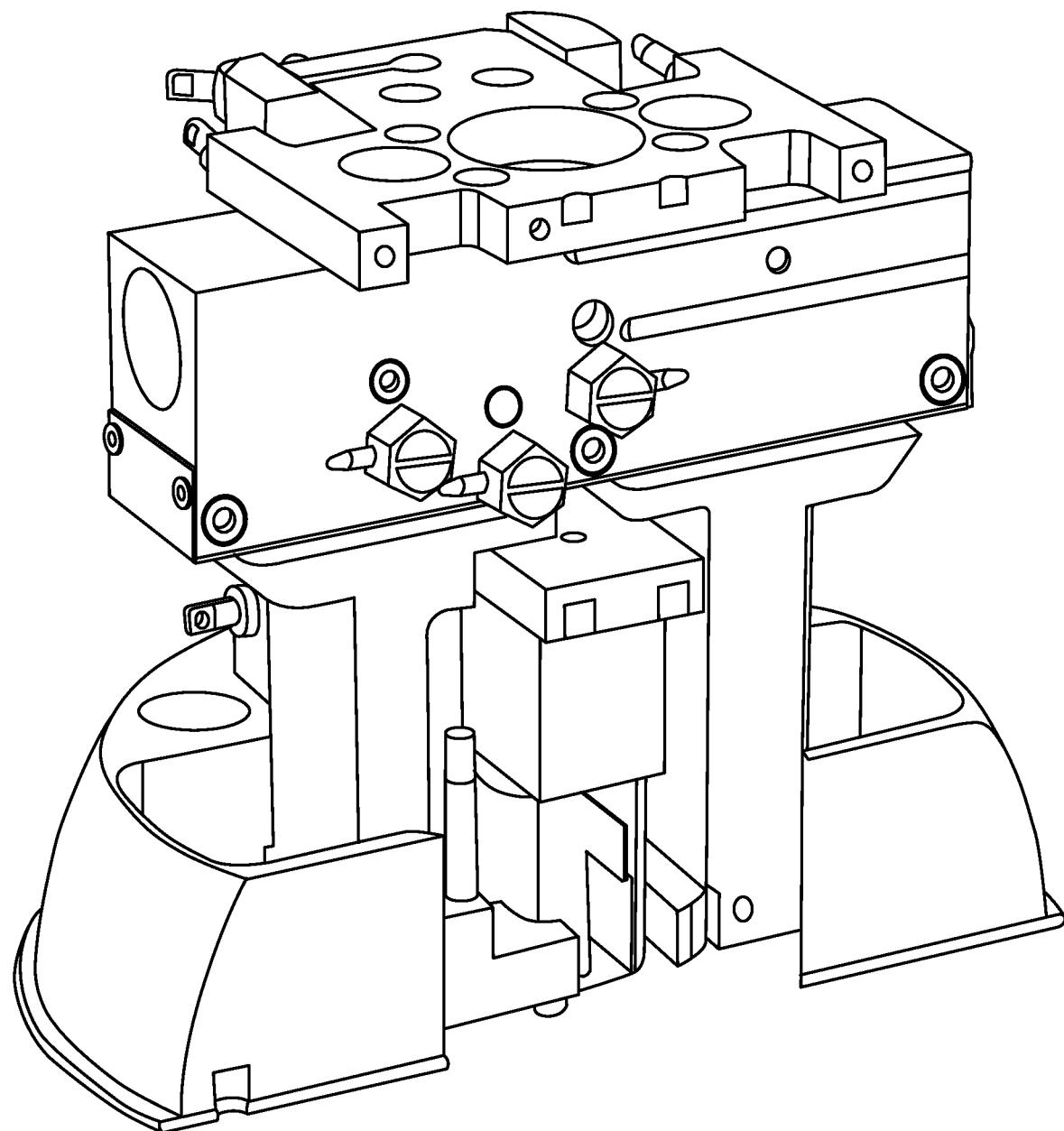
FIG. 12A is an illustration of features of the disclosed embodiments.
Figure 12B:
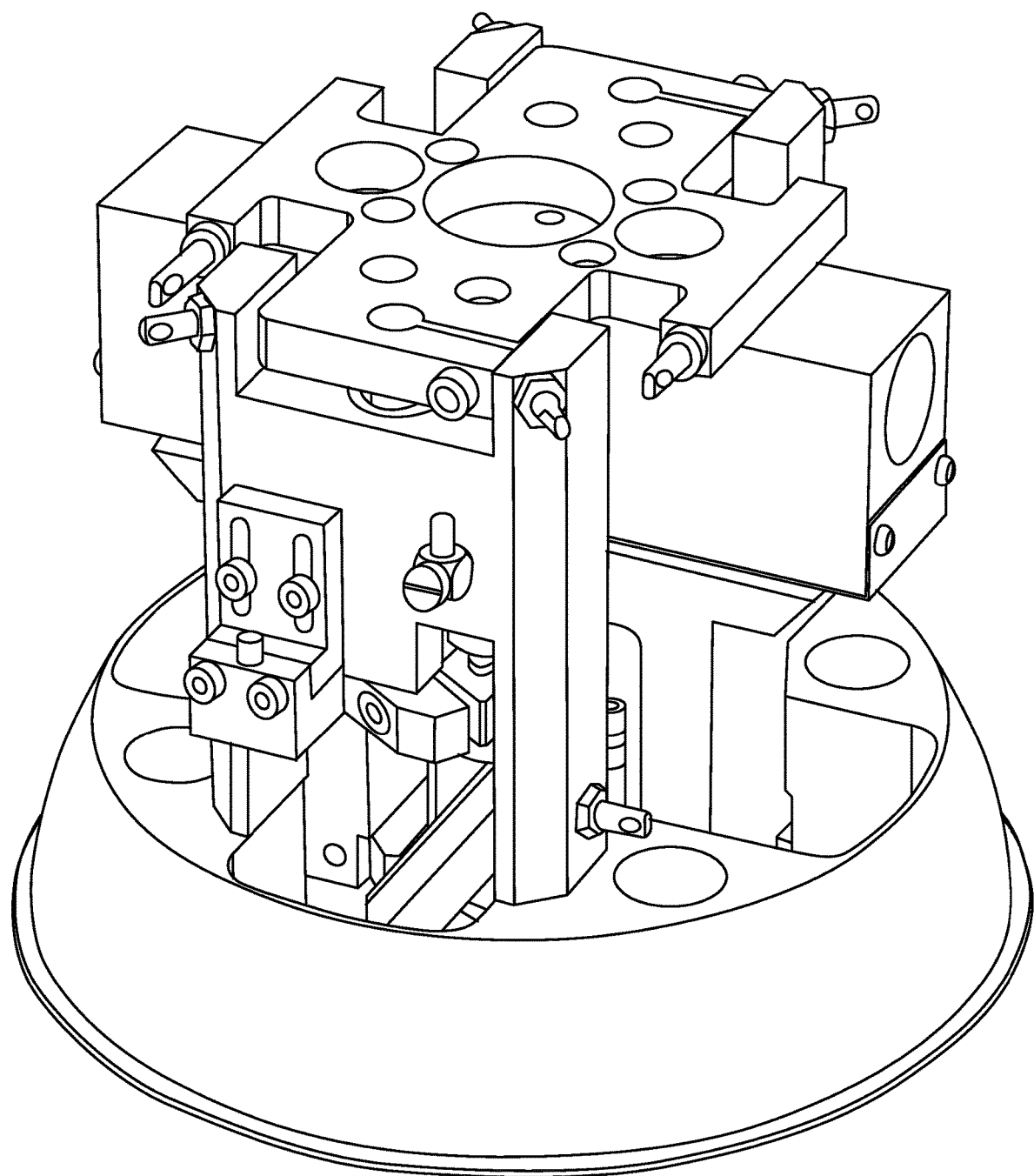
FIG. 12B is an illustration of features of the disclosed embodiments.

FIGS. 12A and 12B illustrate an inverted view of the moving assembly 104 discussed herein. In the illustrations, FIG. 12A provides a cross-sectional view, and FIG. 12B provides a holistic view.

Figure 13:
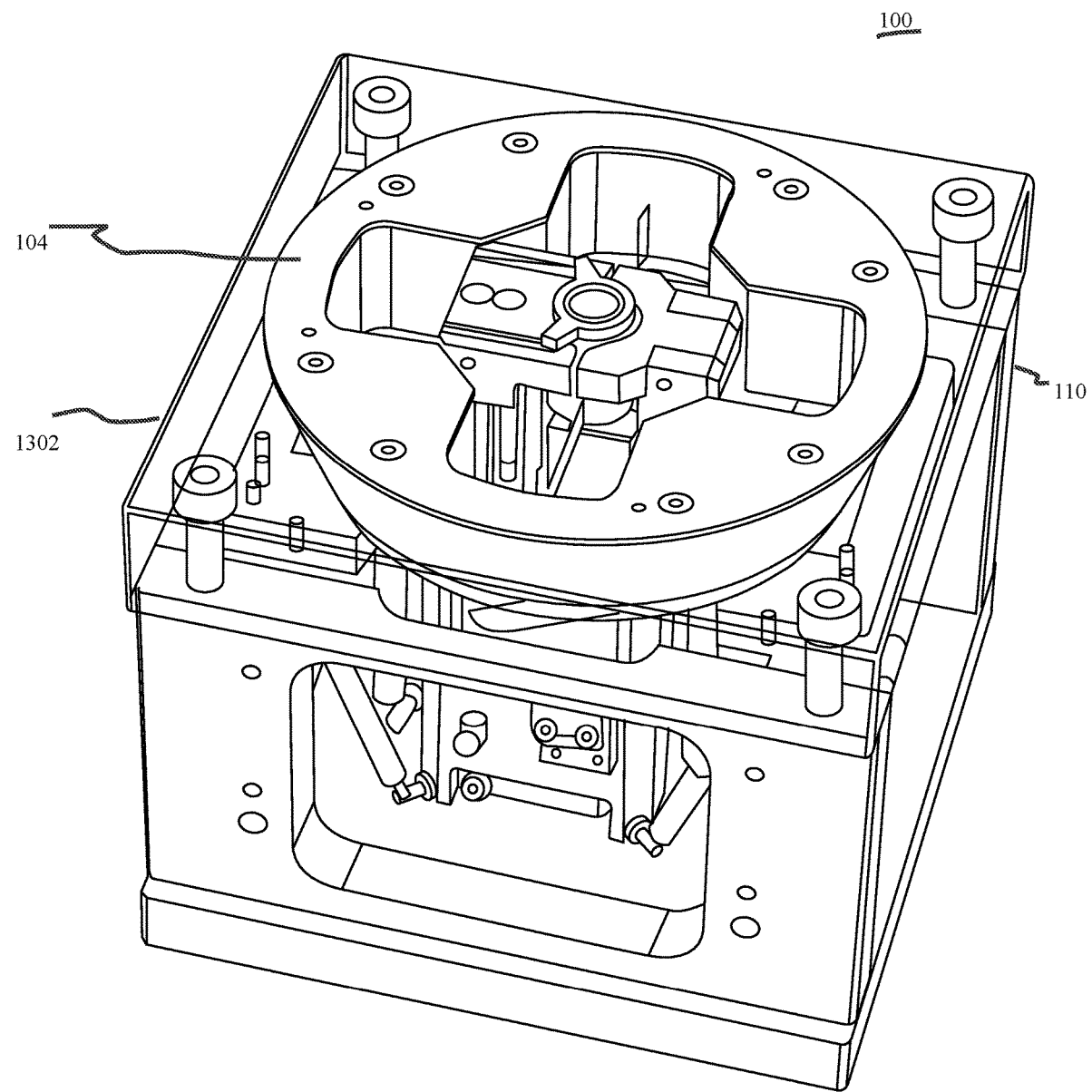
FIG. 13 is an illustration of features of the disclosed embodiments.

FIG. 13 is an illustration of an embodiment of the full assembly of the air bearing system 100, including both the moveable assembly 104 and, in physical association with the moving assembly 104, the frame and stator assembly 110. FIG. 13 includes a ghost view of the topmost portion 1302 of the frame and stator assembly 110, such that the viewer may comprehend an exemplary physical association of the moveable assembly 104 within the topmost opening of the frame and stator assembly 110.

As will be appreciated by the skilled artisan in light of the discussion herein herein, the various devices and elements disclosed may vary in their composition. For example, support structures may be formed of stainless steel, aluminum, composite materials, or the like, that may be suitably subjected to the processes to which the component or device will be exposed while physically associated with the air bearing assembly. Moreover, other materials, such as porous carbon, may be used for various purposes—such as wherein porous carbon, due to its enhanced permeability, may perform differently than stainless steel when a vacuum is actuated on the subject component or device.

Figure 14:
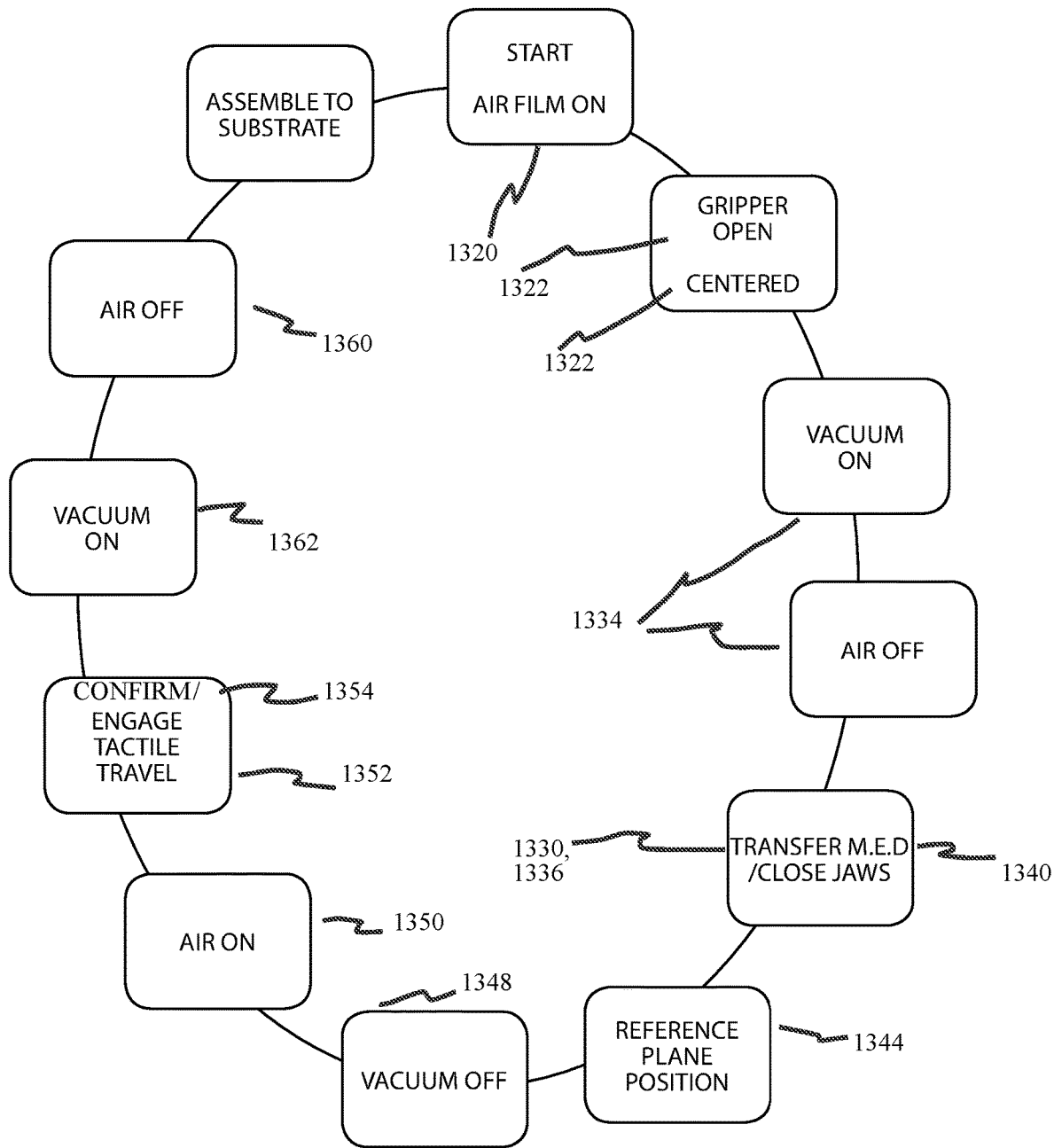
FIG. 14 is an illustration of features of the disclosed embodiments.

FIG. 14 illustrates an exemplary control sequence for the air bearing system discussed herein. The sequence may include delivery of a component or device to the air bearing stage, such as using a handoff tool to which the component or device is affixed, at step 1320. The component or device may be, by non-limiting example, an optical device element, such as a LED projector.

A stage, such as a spherical air bearing stage, may be centered, such as by opening synchronous parallel gripper jaws and engaging symmetrically placed pins against outer jaw ramps proximate to the base portions of said parallel gripper jaws, at step 1322. Closure of the jaw grippers may actuate motion enablers and/or stops, such as may enable the spherical stage to rotate and/or move linearly or in multiple planes, such as enabling rotational movement of +/−6 degrees against external stops, at step 1330.

Thereafter, at step 1332, the handoff tool may be located, such as manually or automatically, atop the spherical stage, and may align with the stage. This alignment may comprise, by way of example, loosely locating alignment pins on the handoff tool into tooling holes on the stage.

At step 1334, air flow associated with the spherical stage may be switched off, and vacuum applied to hold an initial plane. The gripper jaws may then be closed on the component or device at step 1336. The handoff tool is manually or automatically released and removed at step 1340.

A tactile locking system, i.e., a vertical motion system, may be extended to lift the gripper jaws and the clamped component or device at step 1344. The component or device may then be subjected to a second surface reference datum, such as by means of high precision compounded x,y,z, theta powered stages, at step 1346.

At step 1348, the vacuum may be turned off, and at step 1350 the air bearing air supply may be turned on to enable a low friction float. The z-axis actuation of the system may then again be actuated, once more raising the component or device and now engaging it to the referenced second surface, at step 1352. This z-axis travel may be confirmed by sensing at step 1354, such as by a travel sensor mounted along the z-axis.

The air bearing air supply may again be turned off at step 1360, and the air bearing vacuum supply turned on anew at step 1362. At steps 1360 and 1362, the tactile lock may not be implemented, but rather may remain turned off but lifted. At this juncture, the stage may be traversed to a device assembly station, such as a lens assembly station, maintained in position and in plane for subsequent processing, such as a lens bonding.

The foregoing apparatuses, systems and methods may also include control of the various robotic/automation/semi-automation functionality referenced above. Such control may include, by way of non-limiting example, manual control using one or more user interfaces, such as a controller, a keyboard, a mouse, a touch screen, or the like, to allow a user to input instructions for execution by software code associated with the robotics and with system 100 discussed herein. Additionally, and as is well known to those skilled in the art, system control may also be fully automated, such as wherein manual user interaction only occurs to "set up" and program the referenced functionality, i.e., a user may only initially program or upload computing code to carry out the predetermined movements and operational sequences discussed throughout. In either a manual or automated embodiment, the control may be programmed, for example, to relate the known position of the component or device on the stage with the desired planar position in relation to another component.

Figure 15:
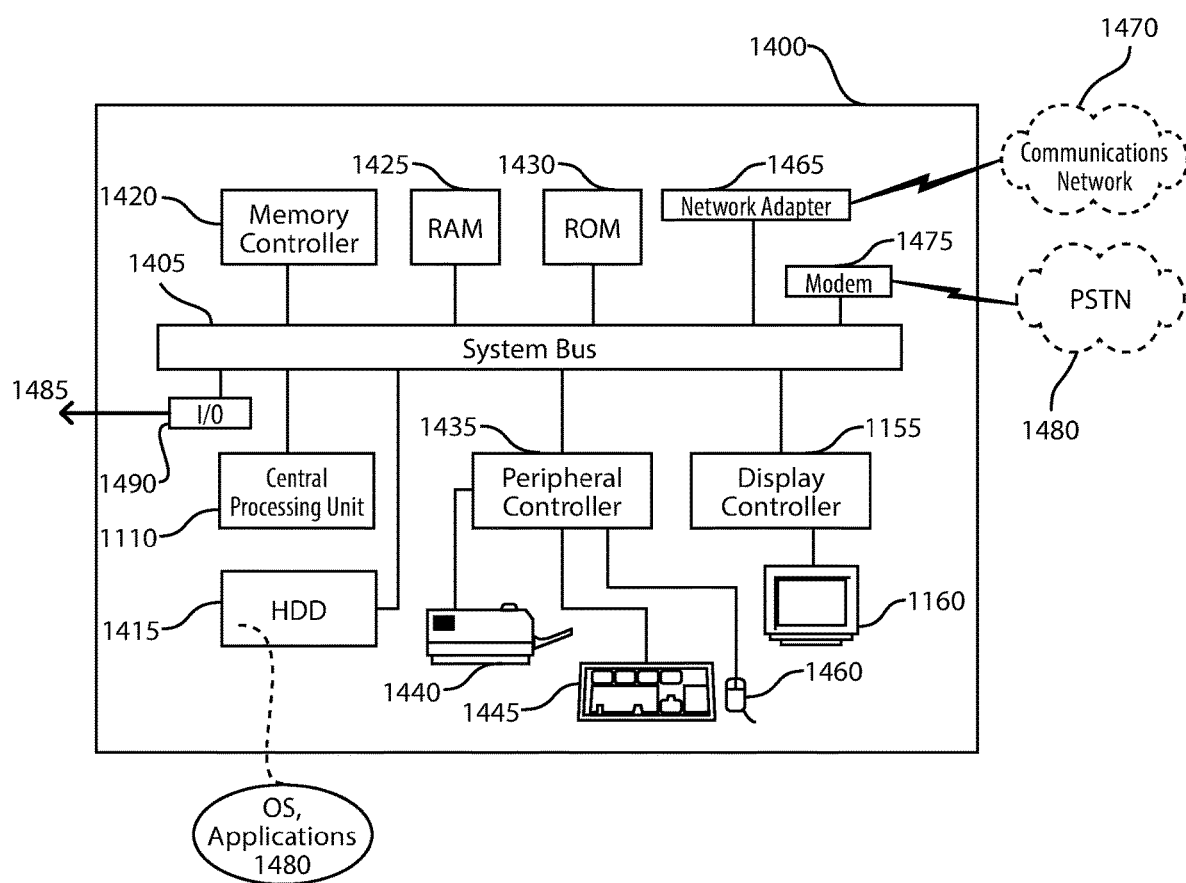
FIG. 15 is an illustration of features of the disclosed embodiments.

FIG. 15 illustrates an exemplary embodiment of a computer processing system 400 that may be operably employed in embodiments discussed herein, including to program the robotic control, and that may accordingly perform the processing and logic discussed throughout. That is, the exemplary computing system 1400 is just one example of a system that may be used in accordance with herein described systems and methods.

Computing system 1400 is capable of executing software, such as an operating system (OS) and one or more computing applications 1490. The software may likewise be suitable for operating and/or monitoring hardware, such as via inputs/outputs (I/O), using said applications 1490.

The operation of exemplary computing system 1400 is controlled primarily by computer readable instructions, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 to cause computing system 1400 to perform the disclosed operations. In many known computer servers, workstations, PLCs, personal computers, mobile devices, and the like, CPU 1410 is implemented in an integrated circuit called a processor.

The various illustrative logics, logical blocks, modules, and engines, described in connection with certain embodiments disclosed herein may be implemented or performed with any of a general purpose CPU, a digital signal processor (DSP), an application specific integrated circuit (ASIC), a field programmable gate array (FPGA) or other programmable logic device, discrete gate or transistor logic, discrete hardware components, or any combination thereof, respectively acting as CPU 1410. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is appreciated that, although exemplary computing system 1400 is shown to comprise a single CPU 1410, such description is merely illustrative, as computing system 400 may comprise a plurality of CPUs 1410. Additionally, computing system 1400 may exploit the resources of remote or parallel CPUs (not shown), for example, through local or remote communications network 1470 or some other data communications means.

In operation, CPU 1410 fetches, decodes, and executes instructions from a computer readable storage medium, such as HDD 1415. Such instructions can be included in the software, such as the operating system (OS), executable programs/applications, and the like. Information, such as computer instructions and other computer readable data, is transferred between components of computing system 1400 via the system's main data-transfer path. The main data-transfer path may use a system bus architecture 1405, although other computer architectures (not shown) can be used, such as architectures using serializers and deserializers and crossbar switches to communicate data between devices over serial communication paths.

System bus 1405 may include data lines for sending data, address lines for sending addresses, and control lines for sending interrupts and for operating the system bus. Some busses provide bus arbitration that regulates access to the bus by extension cards, controllers, and CPU 1410. Devices that attach to the busses and arbitrate access to the bus are called bus masters. Bus master support also allows multiprocessor configurations of the busses to be created by the addition of bus master adapters containing processors and support chips.

Memory devices coupled to system bus 1405 can include random access memory (RAM) 425 and read only memory (ROM) 1430. Such memories include circuitry that allows information to be stored and retrieved. ROMs 1430 generally contain stored data that cannot be modified. Data stored in RAM 1425 can generally be read or changed by CPU 1410 or other communicative hardware devices. Access to RAM 1425 and/or ROM 1430 may be controlled by memory controller 1420. Memory controller 1420 may provide an address translation function that translates virtual addresses into physical addresses as instructions are executed. Memory controller 1420 may also provide a memory protection function that isolates processes within the system and that isolates system processes from user processes. Thus, a program running in user mode can normally access only memory mapped by its own process virtual address space; it cannot access memory within another process' virtual address space unless memory sharing between the processes has been set up.

The steps and/or actions described in connection with the aspects disclosed herein may be embodied directly in hardware, in a software module executed by a processor, or in a combination of the two, in communication with memory controller 1420 in order to gain the requisite performance instructions. That is, the described software modules to perform the functions and provide the directions discussed herein throughout may reside in RAM memory, flash memory, ROM memory, EPROM memory, EEPROM memory, registers, a hard disk, a removable disk, a CD-ROM, or any other form of storage medium known in the art. Any one or more of these exemplary storage medium may be coupled to the processor 1410, such that the processor can read information from, and write information to, that storage medium. In the alternative, the storage medium may be integral to the processor. Further, in some aspects, the processor and the storage medium may reside in an ASIC. Additionally, in some aspects, the steps and/or actions may reside as one or any combination or set of instructions on an external machine readable medium and/or computer readable medium as may be integrated through I/O port(s) 1485, such as a "flash" drive.

In addition, computing system 400 may contain peripheral controller 1435 responsible for communicating instructions using a peripheral bus from CPU 1410 to peripherals and other hardware, such as printer 1440, keyboard 1445, and mouse 1450. An example of a peripheral bus is the Peripheral Component Interconnect (PCI) bus.

One or more hardware input/output (I/O) devices 1485 may be in communication with hardware controller 1490. This hardware communication and control may be implemented in a variety of ways and may include one or more computer busses and/or bridges and/or routers. The I/O devices controlled may include any type of port-based hardware (and may additionally comprise software, firmware, or the like), and can also include network adapters and/or mass storage devices from which the computer system 1400 can send and receive data for the purposes disclosed herein. The computer system 1400 may thus be in communication with the Internet or other networked devices/PLCs via the I/O devices 1485 and/or via communications network 1470.

Display 1460, which is controlled by display controller 1455, may optionally be used to display visual output generated by computing system 1400. Display controller 1455 may also control, or otherwise be communicative with, the display. Visual output may include text, graphics, animated graphics, and/or video, for example. Display 1460 may be implemented with a CRT-based video display, an LCD-based display, gas plasma-based display, touch-panel, or the like. Display controller 1455 includes electronic components required to generate a video signal that is sent for display.

Further, computing system 1400 may contain network adapter 1465 which may be used to couple computing system 1400 to an external communication network 1470, which may include or provide access to the Internet, and hence which may provide or include tracking of and access to the process data discussed herein. Communications network 1470 may provide access to computing system 1400 with means of communicating and transferring software and information electronically, and may be coupled directly to computing system 1400, or indirectly to computing system 1400, such as via PSTN or cellular network 1480. Additionally, communications network 1470 may provide for distributed processing, which involves several computers and the sharing of workloads or cooperative efforts in performing a task. It is appreciated that the network connections shown are exemplary and other means of establishing communications links between multiple computing systems 1400 may be used.

It is appreciated that exemplary computing system 1400 is merely illustrative of a computing environment in which the herein described systems and methods may operate, and thus does not limit the implementation of the herein described systems and methods in computing environments having differing components and configurations. That is, the concepts described herein may be implemented in various computing environments using various components and configurations.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An alignment system for providing at least a planar alignment of at least one component in relation to a reference plane, comprising:
    a frame and stator assembly;
    a movable assembly having spring limited motion within the frame and stator assembly, comprising:
        a floating yoke portion floating on an air stage and having associated therewith a tactile portion that is suitable for assessing a plane of a topmost portion of the component in relation to the reference plane;
        a semi-spherical stage capable of at least rotational movement;
        a chuck within the semi-spherical stage that is capable of at least co-planar, post-planar, and ante-planar positioning in relation to a stage plane provided by a topmost portion of the semispherical stage; and
        at least two synchronized gripper jaws associated with the chuck and being suitable for receiving and holding, at an upper portion thereof, the component, wherein the two gripper jaws comprise, at a lower portion thereof, at least two ramps capable of physically interacting with ones of the motion stops to center the chuck;
    wherein the movable assembly places a plane provided by the topmost portion of the component into a processing position with respect to the reference plane so as to allow for processing of the component and a second electronic element.

2. The system of claim 1, wherein the floating yoke stage comprises movement with at least +/−6 degrees of rotational freedom.

3. The system of claim 1, further comprising a vacuum actuated to hold the component during gripping by the two gripper jaws.

4. The system of claim 1, wherein the tactile portion further comprises at least high precision compounded x,y,z, theta powered stages.

5. The system of claim 1 further comprising a travel sensor for sensing at least z-axis travel of the yoke.

* * * * *